US011869450B2

(12) United States Patent
Zhang

(10) Patent No.: US 11,869,450 B2
(45) Date of Patent: Jan. 9, 2024

(54) DISPLAY BRIGHTNESS ADJUSTMENT METHOD AND RELATED APPARATUS

(71) Applicant: Huawei Technologies Co., Ltd., Shenzhen (CN)

(72) Inventor: Xiufeng Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/917,762

(22) PCT Filed: Apr. 6, 2021

(86) PCT No.: PCT/CN2021/085589
§ 371 (c)(1),
(2) Date: Oct. 7, 2022

(87) PCT Pub. No.: WO2021/204104
PCT Pub. Date: Oct. 14, 2021

(65) Prior Publication Data

US 2023/0169932 A1 Jun. 1, 2023

(30) Foreign Application Priority Data

Apr. 8, 2020 (CN) ......................... 202010270703.1

(51) Int. Cl.
*G09G 3/34* (2006.01)

(52) U.S. Cl.
CPC ......... *G09G 3/3426* (2013.01); *G09G 3/3413* (2013.01); *G09G 2320/0626* (2013.01)

(58) Field of Classification Search
CPC .... G09G 3/3406; G09G 3/3413; G09G 3/342; G09G 3/3426; G09G 2320/0626;
(Continued)

(56) References Cited

U.S. PATENT DOCUMENTS

| | | | | |
|---|---|---|---|---|
| 11,393,412 B2 * | 7/2022 | Chen | .................... | G09G 3/3406 |
| 2009/0189543 A1 | 7/2009 | Yeo et al. | | |

(Continued)

FOREIGN PATENT DOCUMENTS

| | | |
|---|---|---|
| CN | 101494025 A | 7/2009 |
| CN | 101790270 A | 7/2010 |

(Continued)

*Primary Examiner* — Koosha Sharifi-Tafreshi
(74) *Attorney, Agent, or Firm* — Conley Rose, P.C.

(57) ABSTRACT

A display brightness adjustment method includes: an electronic apparatus obtains a to-be-displayed image and determines an average pixel brightness value of each backlight partition on a liquid crystal display (LCD) panel based on the to-be-displayed image, where a backlight region of the LCD panel is divided into a plurality of backlight partitions; the electronic apparatus determines an initial dimming duty cycle corresponding to each backlight partition based on the average pixel brightness value of each backlight partition; the electronic apparatus determines a drive current value based on the initial dimming duty cycle corresponding to each backlight partition and drive current threshold data; the electronic apparatus adjusts, based on the drive current value, light emitting brightness of the backlight region that exists when the to-be-displayed image is displayed.

20 Claims, 8 Drawing Sheets

(58) Field of Classification Search
CPC ..... G09G 2320/0633; G09G 2320/064; G09G 2320/0646; G09G 2320/0653; G09G 2320/0233
See application file for complete search history.

(56) References Cited

U.S. PATENT DOCUMENTS

| | | | | |
|---|---|---|---|---|
| 2011/0025728 | A1 | 2/2011 | Baba et al. | |
| 2013/0234922 | A1 | 9/2013 | Tatsumi | |
| 2014/0307011 | A1 | 10/2014 | Ninan et al. | |
| 2014/0340437 | A1 | 11/2014 | Kohashikawa | |
| 2014/0368527 | A1 | 12/2014 | Fujine et al. | |
| 2015/0356905 | A1 | 12/2015 | Watanabe | |
| 2016/0335957 | A1 | 11/2016 | Fu et al. | |
| 2018/0075813 | A1* | 3/2018 | Zhang .................. | G09G 3/3426 |
| 2018/0120642 | A1* | 5/2018 | Zhang .................. | G09G 3/2081 |

FOREIGN PATENT DOCUMENTS

| | | | |
|---|---|---|---|
| CN | 103310738 | A | 9/2013 |
| CN | 104011786 | A | 8/2014 |
| CN | 104505055 | A | 4/2015 |
| CN | 106297674 | A | 1/2017 |
| CN | 109643526 | A | 4/2019 |
| JP | 2002099250 | A | 4/2002 |
| JP | 2010152174 | A | 7/2010 |
| JP | 2016130866 | A | 7/2016 |
| JP | 2018105979 | A | 7/2018 |
| KR | 20150036956 | A | 4/2015 |
| WO | 2014129007 | A1 | 8/2014 |

* cited by examiner

DISPLAY BRIGHTNESS ADJUSTMENT METHOD AND RELATED APPARATUS

CROSS-REFERENCE TO RELATED APPLICATIONS

This is a National Stage of International Patent Application No. PCT/CN2021/085589 filed on Apr. 6, 2021, which claims priority to Chinese Patent Application No. 202010270703.1 filed on Apr. 8, 2020. Both of the aforementioned applications are hereby incorporated by reference in their entireties.

TECHNICAL FIELD

This application relates to the field of display technologies, and in particular, to a display brightness adjustment method and a related apparatus.

BACKGROUND

With establishment of the high-dynamic range (high-dynamic range, HDR) 10 standard, various HDR standards such as HDR10, hybrid log-gamma (hybrid log-gamma, HLG), Dolby Vision (Dolby Vision), and HDR10+ are successively promoted and applied. HDR display has also become a key feature of display devices such as a TV, a monitor, a tablet computer, and a mobile phone.

Peak brightness is an important indicator for HDR display. Maximum peak display brightness specified in the international standard is 10000 nits (nit). However, due to factors such as materials, screen manufacturing processes, and power consumption, a dynamic brightness range of an actual program source on a screen is 0 nits to 4000 nits. For example, peak brightness of a best existing liquid crystal display (liquid crystal display, LCD) TV is about 4000 nits, peak brightness of a best existing organic-light emitting diode (organic light-emitting diode, OLED) TV is about 1000 nits, and peak brightness of display devices such as a monitor, a computer tablet, a smartphone, and a mobile phone is about 1000 nits. A liquid crystal display (liquid crystal display, LCD) is a passive light emitting body, and emits light by a light emitting diode backlight source on the back. To overcome a static contrast limitation of an LCD screen, a local dimming (local dimming) technology emerges. Backlight of a small part or region of the LCD screen may be adjusted through local dimming, to keep a shadow region of the LCD screen dark and another highlight region bright. A display contrast in an HDR display picture can be effectively improved through local dimming.

A conventional local dimming method is as follows: First, average pixel level (average pixel level, APL) information of a to-be-displayed image is collected. When an APL of the to-be-displayed image is lower than a specified threshold, a high-level large current is used to drive a backlight source of a screen, to ensure that a local highlight region can obtain a larger brightness driving capability. When the APL of the to-be-displayed image is higher than or equal to the specified threshold, a low-level small current is used to drive the backlight source of the screen, to ensure a picture brightness level of the entire image. Then, different pulse width modulation (pulse width modulation, PWM) dimming duty cycles are set for different backlight partitions based on different picture brightness distributions. Overall power consumption does not exceed a capability provided by a power supply design. Consequently, a local dimming method with two levels of currents is rough, and is likely to cause a sudden brightness change during frequent picture switching, affecting user experience.

SUMMARY

This application provides a display brightness adjustment method and a related apparatus, to automatically and continuously adjust display brightness of a displayed image based on content of the displayed image by using a current between a maximum current and a minimum current that are provided by a power supply design for a display panel. In this way, both local peak brightness of HDR display and smooth gradation of brightness of a dynamic picture can be ensured, a power supply capability of the power supply for the display panel is maximized, and an HDR display effect is enhanced.

According to a first aspect, this application provides a display brightness adjustment method, and the method includes: An electronic apparatus obtains a to-be-displayed image. The electronic apparatus determines an average pixel brightness value of each backlight partition on a liquid crystal display panel based on the to-be-displayed image. A backlight region of the liquid crystal display panel is divided into a plurality of backlight partitions. The electronic apparatus determines an initial dimming duty cycle corresponding to each backlight partition based on the average pixel brightness value of each backlight partition. The electronic apparatus determines a drive current value based on the initial dimming duty cycle corresponding to each backlight partition and drive current threshold data, where the drive current threshold data includes an upper drive current threshold and a lower drive current threshold. The electronic apparatus adjusts, based on the drive current value, light emitting brightness of the backlight region that exists when the to-be-displayed image is displayed.

According to the display brightness adjustment method provided in this application, display brightness of a displayed image can be automatically and continuously adjusted based on content of the displayed image by using a current between a maximum current and a minimum current that are provided by a power supply design for the display panel. In this way, both local peak brightness of HDR display and smooth gradation of brightness of a dynamic picture can be ensured, a power supply capability of the power supply for the display panel is maximized, and an HDR display effect is enhanced.

In a possible implementation, the method further includes: The electronic apparatus obtains the drive current threshold data of a backlight source on the liquid crystal display panel.

In a possible implementation, the method further includes: The electronic apparatus determines an actual dimming duty cycle corresponding to each backlight partition based on the initial dimming duty cycle corresponding to each backlight partition and the drive threshold data. The electronic apparatus adjusts light emitting brightness of each backlight partition in the backlight region based on each determined actual dimming duty cycle corresponding to each backlight partition. In this way, a drive current of the backlight source and a dimming duty cycle corresponding to each backlight partition can be dynamically adjusted based on content of the displayed image, to further improve an image contrast and enhance a display effect.

In a possible implementation, that the electronic apparatus determines a drive current value based on the initial dimming duty cycle corresponding to each backlight partition and drive current threshold data specifically includes: The electronic apparatus determines the drive current value based on a maximum value and a minimum value in the initial dimming duty cycles corresponding to the backlight partitions and the drive current threshold data.

In a possible implementation, that the electronic apparatus determines the drive current value based on a maximum value and a minimum value in the initial dimming duty cycles corresponding to the backlight partitions and the drive current threshold data specifically includes: First, the electronic apparatus determines a current gain based on the maximum value and the minimum value in the initial dimming duty cycles corresponding to the backlight partitions and the drive current threshold data. Then, the electronic apparatus determines the drive current value based on the drive current threshold data and the current gain.

In a possible implementation, that the electronic apparatus determines an actual dimming duty cycle corresponding to each backlight partition based on the initial dimming duty cycle corresponding to each backlight partition and the drive threshold data specifically includes: First, the electronic apparatus determines a brightness gain corresponding to each backlight partition based on the initial dimming duty cycle corresponding to each backlight partition. Then, the electronic apparatus determines the actual dimming duty cycle corresponding to each backlight partition based on the initial dimming duty cycle corresponding to each backlight partition, the drive current threshold data, and the brightness gain corresponding to each backlight partition.

In a possible implementation, that the electronic apparatus determines the actual dimming duty cycle corresponding to each backlight partition based on the initial dimming duty cycle corresponding to each backlight partition, the drive current threshold data, and the brightness gain corresponding to each backlight partition specifically includes: First, the electronic apparatus may determine a current gain based on a maximum value and a minimum value in the initial dimming duty cycles corresponding to the backlight partitions and the drive current threshold data. Then, the electronic apparatus determines the actual dimming duty cycle corresponding to each backlight partition based on the current gain, the initial dimming duty cycle corresponding to each backlight partition, and the brightness gain corresponding to each backlight partition.

According to a second aspect, this application provides a display device, including a liquid crystal display panel, one or more processors, and one or more memories. The one or more memories and the liquid crystal display panel are coupled to the one or more processors. The one or more memories are configured to store computer program code, and the computer program code includes computer instructions. When the one or more processors execute the computer instructions, the display device is enabled to perform the display brightness adjustment method according to any possible implementation of the foregoing aspect. The processor may be an application processor AP. The display device may be a TV, a tablet computer, a mobile phone, or a display.

According to a third aspect, this application provides a computer storage medium, including computer instructions. When the computer instructions are run on a display device, the display device is enabled to perform the display brightness adjustment method according to any possible implementation of any one of the foregoing aspects.

According to a fourth aspect, this application provides a computer program product. When the computer program product is run on a computer, the computer is enabled to perform the display brightness adjustment method according to any possible implementation of any one of the foregoing aspects.

According to a fifth aspect, this application provides a display device, including one or more function modules. The one or more function modules are configured to perform the method for adjusting brightness of a display device in any possible implementation of any one of the foregoing aspects. The display device may be a TV, a tablet computer, a mobile phone, or a display.

According to a sixth aspect, this application provides an LCD backlight control apparatus, including one or more processors and one or more memories. The one or more memories are coupled to the one or more processors. The one or more memories are configured to store computer program code, and the computer program code includes computer instructions. When the one or more processors execute the computer instructions, the LCD backlight control apparatus is enabled to perform the display brightness adjustment method according to any possible implementation of any one of the foregoing aspects. The LCD backlight control apparatus may be an application processor AP.

DESCRIPTION OF EMBODIMENTS

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Embodiments of this application provide a display brightness adjustment method, to automatically and continuously adjust display brightness of a displayed image based on content of the displayed image by using a current between a maximum current and a minimum current that are provided by a power supply design for a display panel. In this way, both local peak brightness of HDR display and smooth gradation of brightness of a dynamic picture can be ensured, a power supply capability of the power supply for the display panel is maximized, and an HDR display effect is enhanced.

The following describes a schematic diagram of a structure of a display device 100 according to this application.

Figure 1:
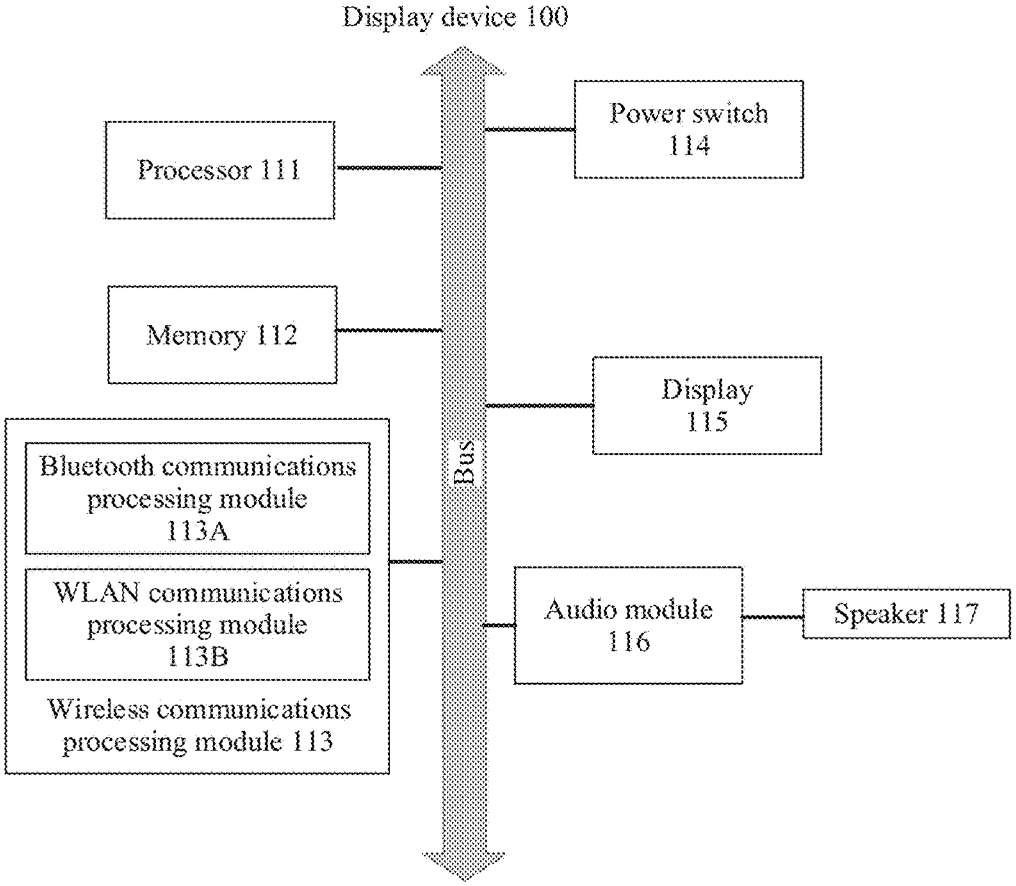
FIG. 1 is a schematic diagram of a structure of a display device according to an embodiment of this application.

As shown in FIG. 1, the display device 100 may include a processor 1/1, a memory 112, a wireless communications processing module 113, a power switch 114, a display 115, an audio module 116, and a speaker 117.

The processor 111 may include one or more processing units. For example, the processor 111 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the display device 100. The controller may generate an operation control signal based on an instruction operation code and a time sequence signal, to complete control of instruction reading and instruction execution.

The memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor may directly invoke the instructions or the data from the memory. This avoids repeated access, reduces waiting time of the processor 110, and improves system efficiency.

The memory 112 is coupled to the processor 111, and is configured to store various software programs and/or a plurality of groups of instructions. The memory 112 may be configured to store computer-executable program code, and the executable program code includes instructions. The processor 111 performs various function applications and data processing of the display device 100 by running the instructions stored in the memory 112. The memory 112 may include a program storage area and a data storage area. The program storage area may store an operating system, an application required by at least one function (for example, a sound playing function and an image playing function), and the like. The data storage area may store data (for example, audio data, and to-be-displayed image data) and the like created in a process of using the display device 100. In addition, the memory 112 may include a high-speed random access memory, or may include a nonvolatile memory, for example, at least one magnetic disk storage device, a flash memory, or a universal flash storage (universal flash storage, UFS).

The wireless communications module 113 may provide a wireless communication solution that is applied to the display device 100 and that includes a wireless local area network (wireless local area networks, WLAN) (for example, a wireless fidelity (wireless fidelity, Wi-Fi) network). Bluetooth (Bluetooth, BT), a global navigation satellite system (global navigation satellite system. GNSS), frequency modulation (frequency modulation, FM), near field communication (near field communication, NFC), and an infrared (infrared, IR) technology.

In some embodiments, the wireless communications processing module 113 may include a Bluetooth (BT) communications processing module 113A and a WLAN communications processing module 113B. One or more of the Bluetooth (BT) communications processing module 113A and the WLAN communications processing module 113B may monitor a signal transmitted by another device, for example, a probe request or a scanning signal, and may send a response signal, for example, a probe response or a scanning response, so that the another device can discover the display device 100, and the display device 100 establishes a wireless communication connection to the another device, and communicates with the another device by using one or more wireless communications technologies in Bluetooth or WLAN. The Bluetooth (BT) communications processing module 113A may provide a Bluetooth communication solution including one or more of classic Bluetooth (BR/EDR) or Bluetooth low energy (Bluetooth low energy, BLE). The WLAN communications processing module 113B may provide a WLAN communication solution including one or more of Wi-Fi Direct, a Wi-Fi LAN, or Wi-Fi SoftAP.

The power switch 114 may be configured to control power supplied by a power supply to the display device 100. In some embodiments, the power switch 114 may be configured to control power supplied by an external power supply to the display device 100.

In some embodiments, the display device 100 may further include a battery, a charging management module, and a power management module. The battery may be configured to supply power to the display device 100. The charging management module is configured to receive a charging input from a charger. The charger may be a wireless charger or a wired charger. In some embodiments of wired charging, the charging management module may receive a charging input of a wired charger through a USB interface. In some embodiments of wireless charging, the charging management module may receive a wireless charging input through a wireless charging coil of the display device 100. When charging the battery, the charging management module may further supply power to the electronic device through the power management module. The power management module is configured to connect the battery and the charging management module to the processor 111. The power management module receives an input of the battery and/or an input of the charging management module, and supplies power to the processor 111, the memory 112, the display 115, the wireless communications module 113, and the like.

The power management module may be further configured to monitor parameters such as a battery capacity, a quantity of battery cycles, and a battery health status (electric leakage or impedance). In some other embodiments, the power management module may alternatively be disposed in the processor 111. In some other embodiments, the power management module and the charging management module may alternatively be disposed in a same component.

The display 115 may be configured to display an image, a video, and the like. The display 115 includes a display panel. In embodiments of this application, the display panel uses a liquid crystal display (liquid crystal display, LCD). The LCD may include a direct lit backlight LCD and an edge lit backlight LCD.

Figure 2:
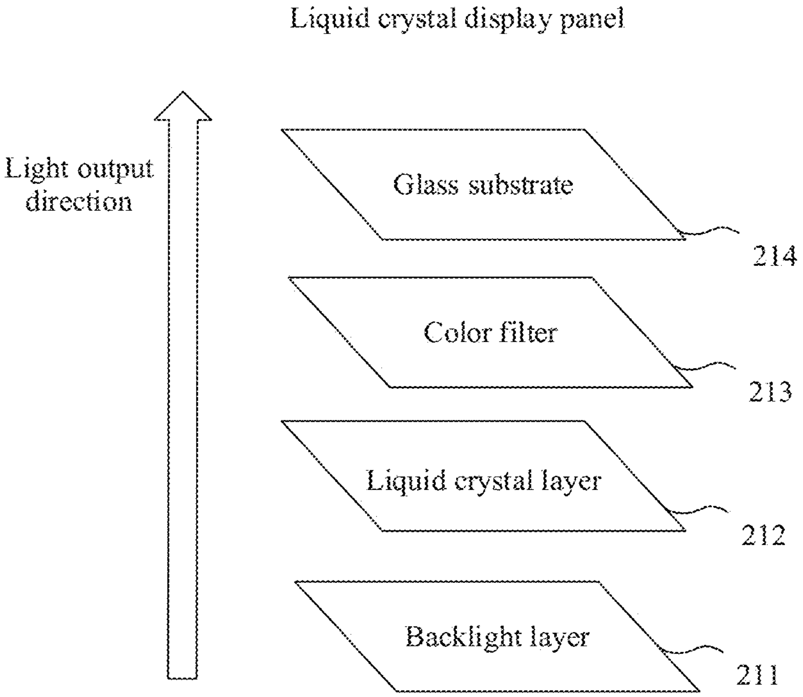
FIG. 2 is a schematic diagram of a structure of a liquid crystal display panel according to an embodiment of this application.

FIG. 2 is a schematic diagram of a structure of an LCD display panel according to an embodiment of this application.

As shown in FIG. 2, the LCD display panel includes a backlight layer 211, a liquid crystal layer 212, a color filter 213, and a glass substrate 214. The backlight layer 211 may be configured to display white light driven by a current. In embodiments of this application, brightness of white light displayed by the backlight layer 211 may be changed by changing a value of the drive current and a pulse width modulation (PWM) duty cycle of the drive current, to change overall brightness of a picture. For example, under a same PWM duty cycle, a larger drive current indicates higher brightness of white light displayed by the backlight layer 211. For another example, at drive currents with a same value, a larger PWM duty cycle indicates higher brightness of white light displayed by the backlight layer 211.

The color filter 213 may include three types of filters: red, green, and blue. The color filter 213 in each color display unit presents one color. Each pixel may include three types of color display units: red, green, and blue.

In some embodiments, the color filter 213 may include four types of filters: red, green, blue, and white. Each pixel may include four types of color display units: red, green, blue, and white.

The liquid crystal layer 212 may be configured to receive a voltage control signal to control an amount of white light that is displayed by the backlight layer 211 and that is emitted into the color filter 213. The liquid crystal layer 212 may separately control an amount of light that is of white light displayed by the backlight layer 211 and that is emitted into each color display unit. The liquid crystal layer 212 may adjust, by adjusting white light entering proportions of various color filers in a pixel, the pixel to display different colors.

The glass substrate 211 is transparent, and may be configured to support the entire LCD panel.

In embodiments of this application, the LCD display panel includes two types of display panels: a direct lit backlight LCD panel and an edge lit backlight LCD panel. A structure of the direct lit backlight LCD panel is different from that of the edge lit backlight LCD panel in a backlight layer.

Figure 3A:
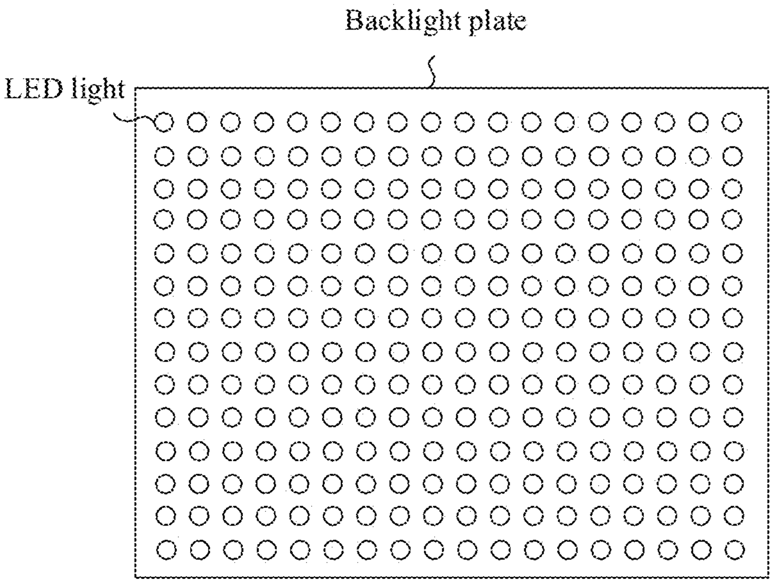
FIG. 3A is a schematic diagram of a structure of a backlight layer of a direct lit backlight LCD according to an embodiment of this application.

FIG. 3A is a schematic diagram of a structure of a backlight layer of a direct lit backlight LCD panel according to an embodiment of this application. As shown in FIG. 3A, the backlight layer of the direct lit backlight LCD panel includes a backlight plate. The backlight plate includes a large quantity of light emitting diode (light emitting diode, LED) backlights arranged in a matrix. The backlight plate may include a large quantity of LED backlights, and the backlight plate may be configured to display white light driven by a current.

Figure 3B:
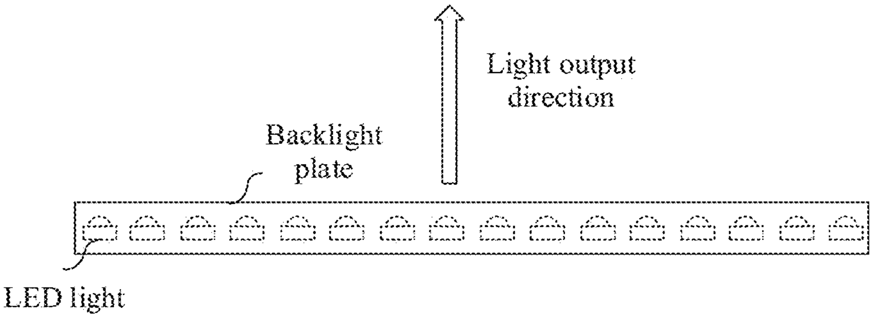
FIG. 3B is a schematic diagram of a side view of a backlight layer of a direct lit backlight LCD according to an embodiment of this application.

FIG. 3B is a side view of a backlight layer of a direct lit backlight LCD panel according to an embodiment of this application. As shown in FIG. 3B, the backlight plate may be configured to enable, driven by a current, an LED light on the backlight plate to display white light in a specified direction.

Figure 4A:
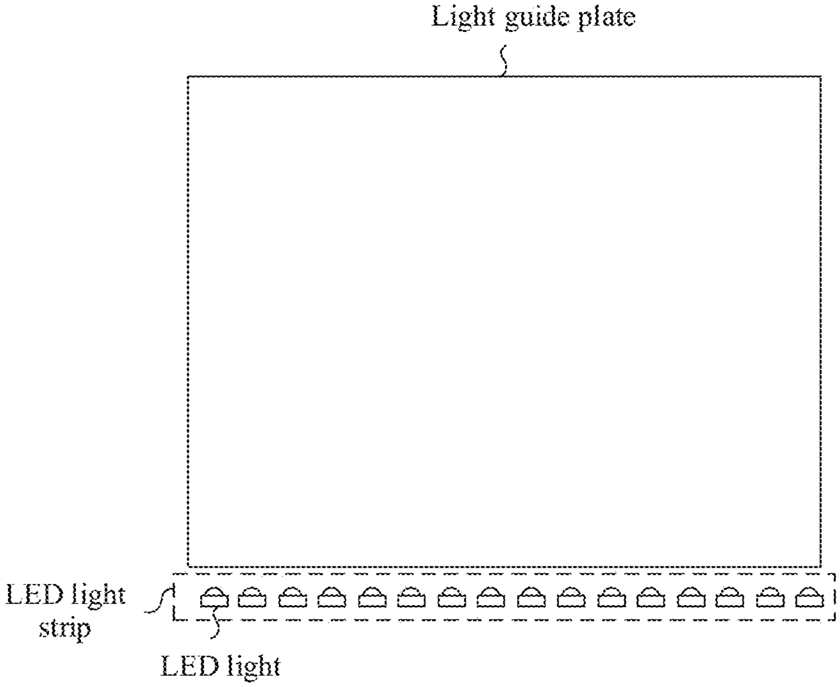
FIG. 4A is a schematic diagram of a structure of a backlight layer of an edge lit backlight LCD according to an embodiment of this application.

FIG. 4A is a schematic diagram of a structure of a backlight layer of an edge lit backlight LCD panel according to an embodiment of this application. As shown in FIG. 4A, the backlight layer of the edge lit backlight LCD includes a light guide plate (light guide plate, LGP) and an LED light strip. The LED light strip is disposed on a side edge (for example, a lower side edge) of the light guide plate. The LED light strip includes a plurality of LED lights arranged linearly.

In some embodiments, LED light strips may be further placed on a plurality of side edges of the light guide plate of the edge lit backlight LCD to form a two-dimensional (2D) edge lit backlight LCD.

Figure 4B:
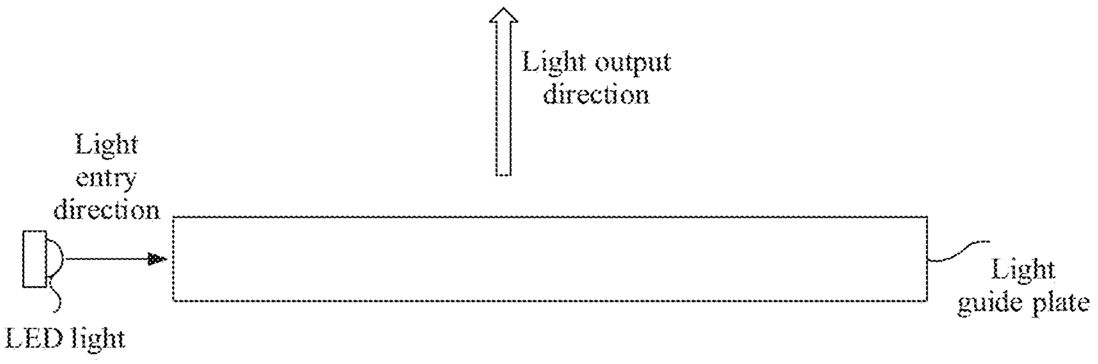
FIG. 4B is a schematic diagram of a side view of a backlight layer of an edge lit backlight LCD according to an embodiment of this application.

FIG. 4B is a side view of a backlight layer of an edge lit backlight LCD panel according to an embodiment of this application. As shown in FIG. 4B, when white light displayed by the LED light strip is emitted from the side edge of the light guide plate, the light guide plate may enable the emitted white light to be emitted in a specified direction.

In embodiments of this application, a backlight region of the display 115 may be divided into a plurality of backlight partitions. When the display 115 is a direct lit backlight LCD, the backlight region of the display 115 may be divided into M×N backlight partitions, where both M and N are integers greater than 1. When the display 115 is an edge lit backlight LCD, the backlight region of the display 115 may be divided into T backlight partitions, where T is an integer greater than 1. Usually, the backlight region of the direct lit backlight LCD may be divided more finely than the backlight region of the edge lit backlight LCD. Therefore, for displays of a same size, a quantity of backlight partitions obtained by dividing the direct lit backlight LCD is greater than a quantity of backlight partitions obtained by dividing the edge lit backlight LCD, and a backlight partition obtained by dividing the direct lit backlight LCD is smaller.

In some embodiments, when the display 115 is a two-dimensional (2D) edge lit backlight LCD, the backlight region of the display 115 may be divided into R×S backlight partitions. For example, R may be 4, and S may be 2. The backlight region of the display 115 may be divided into eight backlight partitions.

Figure 5:
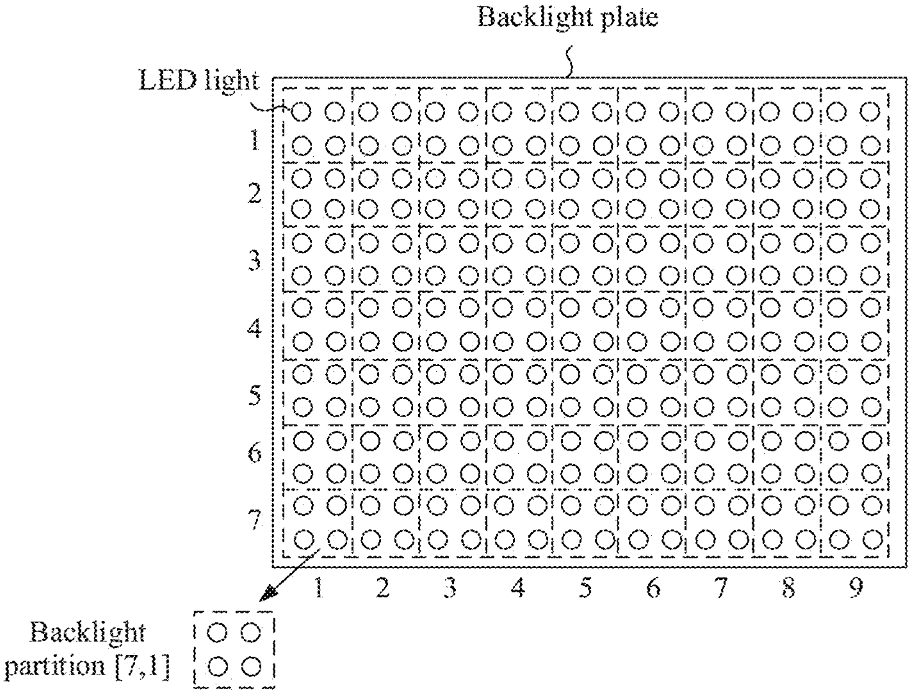
FIG. 5 is a schematic diagram of partitioning of a backlight region of a direct lit backlight LCD according to an embodiment of this application.

FIG. 5 is a schematic diagram of backlight partition division of a direct lit backlight LCD according to an embodiment of this application. As shown in FIG. 5, a backlight region of the direct lit backlight LCD may be divided into 7×9 backlight partitions, that is, M=7 and N=9. A backlight partition [m, n] may represent a backlight partition in the $m^{th}$ row and the $n^{th}$ column in the backlight region of the direct lit backlight LCD, where $1 \le m \le M$, and $1 \le n \le N$. For example, a backlight partition [7, 1] may represent a backlight partition in the seventh row and the first column in the backlight region of the direct lit backlight LCD.

Figure 6:
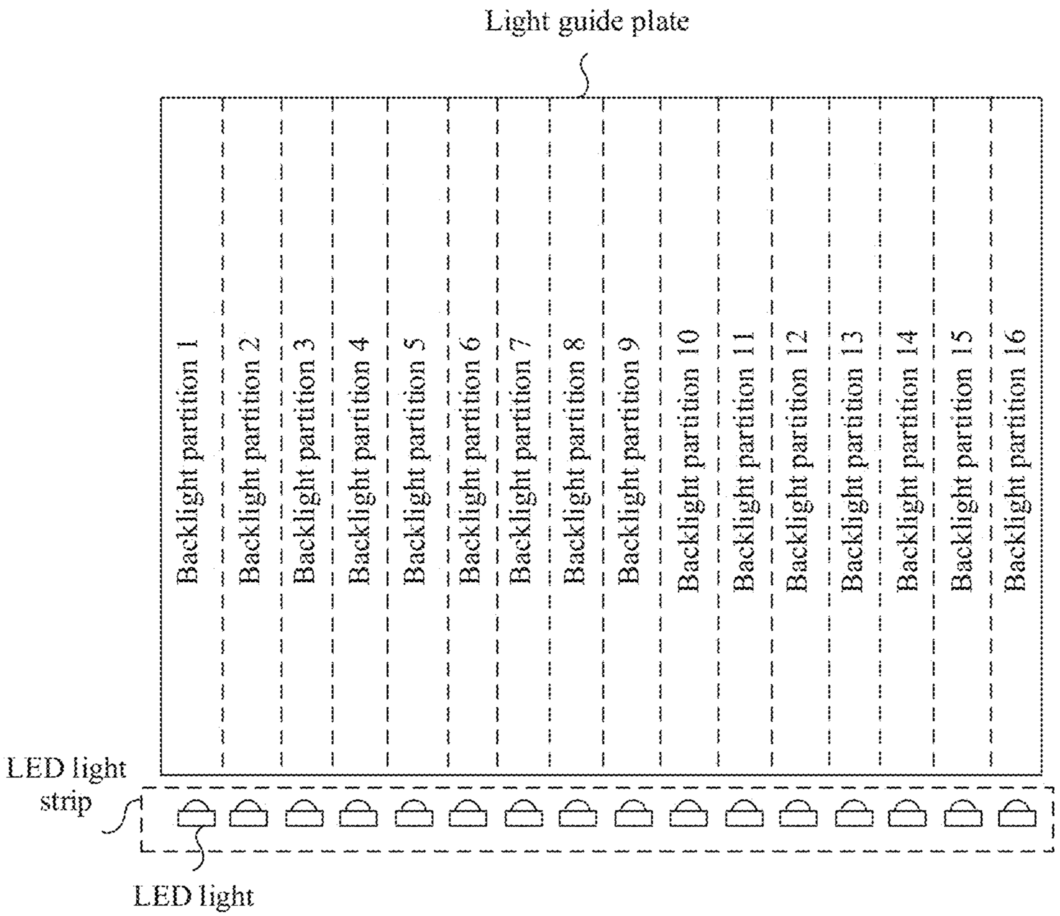
FIG. 6 is a schematic diagram of partitioning of a backlight region of an edge lit backlight LCD according to an embodiment of this application.

FIG. 6 is a schematic diagram of backlight partition division of an edge lit backlight LCD according to an embodiment of this application. As shown in FIG. 6, the edge lit backlight LCD is a one-dimensional (1D) edge lit backlight LCD. A backlight region of the 1D edge lit backlight LCD may be divided into 16 backlight partitions, that is, L=16. A backlight partition [t] may be used to represent the $t^{th}$ backlight partition in the backlight region of the 1D edge lit backlight LCD, where 1≤t≤T. For example, a backlight partition [4] may represent the fourth backlight partition in the backlight region of the 1D edge lit backlight LCD.

In embodiments of this application, the display device 100 may control an overall brightness level of the backlight region by changing a value of a drive current of a backlight source of the display 115. A larger drive current indicates a higher overall brightness level of the backlight region. The display device 100 may control a display brightness difference between the backlight partitions by controlling a PWN dimming duty cycle of each backlight partition in the backlight region.

PWN dimming is to control on and off time of a display unit by controlling on and off time of a current, to adjust brightness of the display unit. The PWN dimming duty cycle may be a ratio of on time of a current to an entire signal cycle in the signal cycle. For example, when the PWN dimming duty cycle is 100%, display brightness of the display unit is 600 nits, and when the PWN dimming duty cycle is 50%, display brightness of the display unit may be 300 nits. The foregoing example is merely used to explain this application and shall not be construed as a limitation.

The audio module 116 may be configured to convert a digital audio signal into an analog audio signal for output, and may be also configured to convert an analog audio input into a digital audio signal. The audio module 116 may be further configured to encode and decode an audio signal. In some embodiments, the audio module 116 may be disposed in the processor 111, or some function modules in the audio module 116 are disposed in the processor 111. The audio module 116 may transmit an audio signal to the wireless communications module 113 through a bus interface (for example, a UART interface), to implement a function of playing the audio signal through a Bluetooth speaker.

The speaker 117 may be configured to convert an audio signal sent by the audio module 116 into a sound signal.

In some embodiments, the display device 100 may further include a microphone, which is also referred to as a "mic" and a "mike", and is configured to convert a sound signal into an electrical signal. When sending a voice control instruction, a user may make a sound through the mouth, to input a sound signal to the microphone.

In some embodiments, the display device 100 may further include a wired local area network (local area network, LAN) communications processing module, a high definition multimedia interface (high definition multimedia interface, HDMI) communications processing module, and a universal serial bus (universal serial bus, USB) communications processing module. The wired LAN communications processing module may be configured to communicate with another device in a same LAN over a wired LAN, may be further configured to connect to a WAN over the wired LAN, and may communicate with a device in the WAN. The HDMI communications processing module may be configured to communicate with another device through an HDMI interface. For example, the HDMI communications processing module may receive, through the HDMI interface, HDR video data sent by a set-top box. The USB communications processing module may be configured to communicate with another device through a USB interface.

According to the display brightness adjustment method provided in embodiments of this application, the electronic apparatus can automatically and continuously adjust display brightness of a displayed image based on content of the displayed image by using a current between a maximum current and a minimum current that are provided by a power supply design for the display panel. In this way, both local peak brightness of HDR display and smooth gradation of brightness of a dynamic picture can be ensured, a power supply capability of the power supply for the display panel is maximized, and an HDR display effect is enhanced.

In embodiments of this application, the electronic apparatus may be a display device, a display apparatus, or the like. In following embodiments of this application, a display device is used as an example of an electronic apparatus to describe the display brightness adjustment method provided in embodiments of this application.

The following describes the display brightness adjustment method provided in embodiments of this application.

Figure 7:
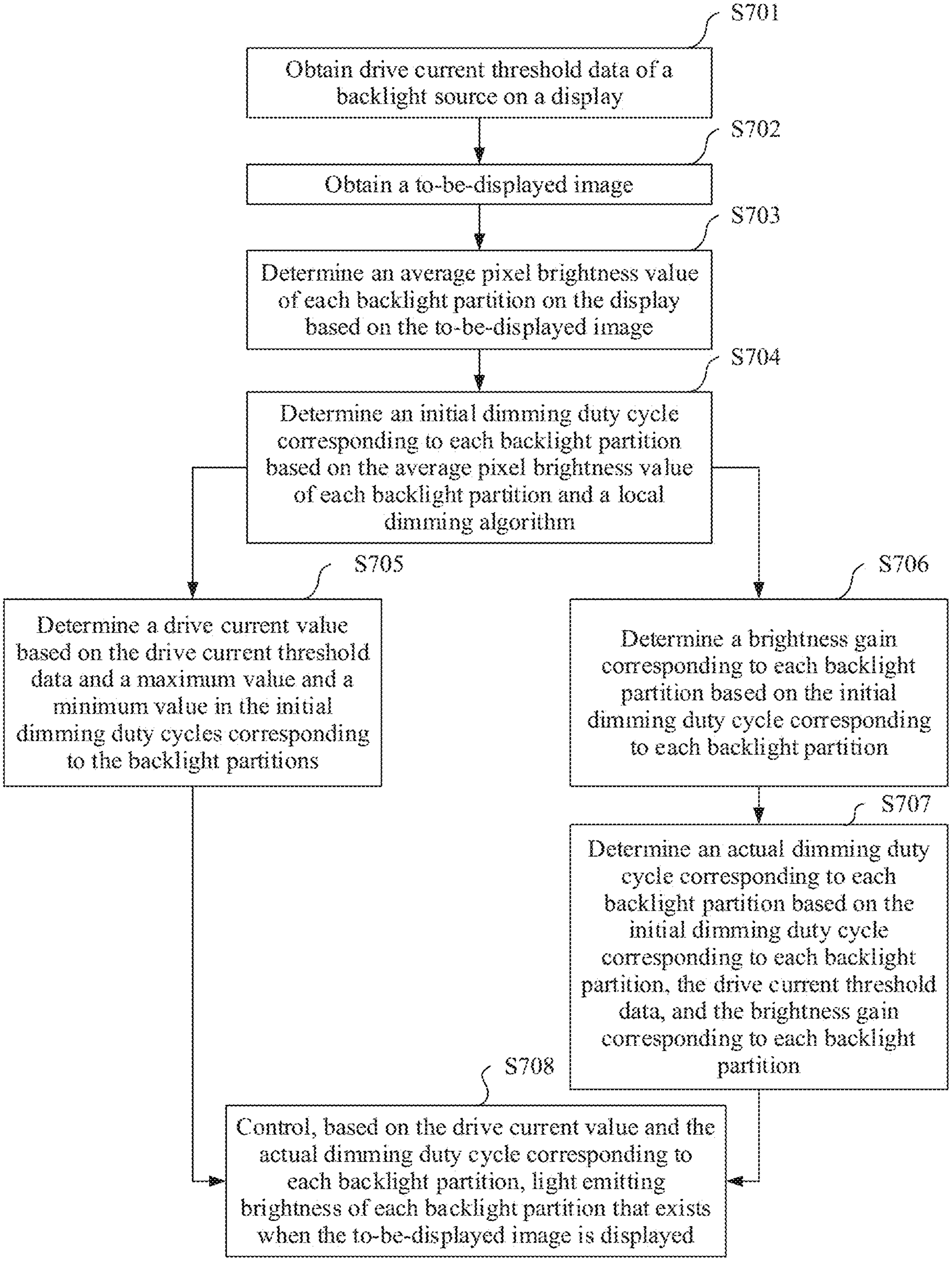
FIG. 7 is a schematic flowchart of a display brightness adjustment method according to an embodiment of this application.

FIG. 7 is a schematic flowchart of a display brightness adjustment method according to an embodiment of this application. As shown in FIG. 7, the method includes the following steps.

S701: A display device obtains drive current threshold data of a backlight source on a display.

The drive current threshold data includes an upper drive current threshold and a lower drive current threshold that are set for the backlight source on the display when a power supply of the display device is designed before delivery. The display device may obtain, from a local memory, the drive current threshold data designed by a power management module for the backlight source on the display.

S702: The display device obtains a to-be-displayed image.

The display device may obtain the to-be-displayed image from to-be-displayed video data, and the to-be-displayed image is a picture of each frame in the video data. For example, when the display device is playing an HDR video, the display device may parse data of the HDR video to obtain a picture of next frame as the to-be-displayed image.

In a possible implementation, the to-be-displayed image may alternatively be a picture selected by a user. For example, in response to a detected display operation of the user on an HDR picture, the display device may obtain the HDR picture locally or from a network, and use the HDR picture as the to-be-displayed image.

S703: The display device determines an average pixel brightness value of each backlight partition on the display based on the to-be-displayed image.

After obtaining the to-be-displayed image, the display device may convert the to-be-displayed image into image information (for example, RGB data). The image information includes a brightness value of each pixel that exists when the display displays the to-be-displayed image. The display device may calculate an average pixel brightness value of each backlight partition based on the image information (for example, the RGB data).

S704: The display device determines an initial dimming duty cycle corresponding to each backlight partition based on the average pixel brightness value of each backlight partition and a local dimming algorithm.

The local dimming (local dimming) algorithm establishes a mapping relationship from an average pixel brightness value of a backlight partition to an initial dimming duty cycle of the backlight partition.

For example, the mapping relationship from an average pixel brightness value of a backlight partition to an initial dimming duty cycle of the backlight partition may be shown in Table 1:

TABLE 1

| Average pixel brightness value of a backlight partition | Initial dimming duty cycle of the backlight partition |
|---|---|
| 0 | 0% |
| 1 | 6.25% |
| . . . | . . . |
| 128 | 50% |
| . . . | . . . |
| 255 | 100% |

It can be learned from Table 1 that a value range of the average pixel brightness value may be 0 to 255. When the average pixel brightness value of the backlight partition is 0, the initial dimming duty cycle of the backlight partition is 0%. When the average pixel brightness value of the backlight partition is 1, the initial dimming duty cycle of the backlight partition is 6.25%. When the average pixel brightness value of the backlight partition is 128, the initial dimming duty cycle of the backlight partition is 50%. When the average pixel brightness value of the backlight partition is 255, the initial dimming duty cycle of the backlight partition is 100%. Table 1 is merely used to explain this application and shall not be construed as a limitation.

For example, a backlight region of the display on the display device may be divided into 7.9, that is, 63 backlight partitions. The display device may calculate respective initial dimming duty cycles of the 63 backlight partitions based on respective average pixel brightness of the 63 backlight partitions and the local dimming algorithm. The foregoing examples are merely used to explain this application and shall not be construed as a limitation.

When the display is a direct lit backlight (2D) LCD, an initial dimming duty cycle of each backlight partition may be represented by duty0[m,n]. For example, duty0[7,1] many represent an initial dimming duty cycle corresponding to a backlight partition in the seventh row and the first column in the backlight region of the display. When the display is a one dimension (1D) edge lit backlight LCD, an initial dimming duty cycle of each backlight partition may be represented by duty0[t]. For example, duty0[5] may represent an initial dimming duty cycle corresponding to the fifth backlight partition in the backlight region of the display.

S705: The display device determines a drive current value based on a maximum value and a minimum value in the initial dimming duty cycles corresponding to the backlight partitions and the drive current threshold data.

A larger maximum difference between the initial dimming duty cycles of the backlight partitions indicates a larger drive current value of the backlight source, and a smaller maximum difference between the initial dimming duty cycles of the backlight partitions indicates a smaller drive current value of the backlight source.

In a possible implementation, the display device may first determine a current gain based on the maximum value in the initial dimming duty cycles corresponding to the backlight partitions, the minimum value in the initial dimming duty cycles, and the drive current threshold data. Then, the display device may determine the drive current value based on the current gain and the drive current threshold data.

The display device may determine the current gain based on a maximum difference between the initial dimming duty cycles of the backlight partitions and the drive current threshold data according to the following formula (1) and formula (2). The formula (1) and formula (2) may be as follows:

$$i.\text{gain} = \frac{\text{duty 0.max} - \text{duty 0.min}}{100\%} * i.\text{gain.max} \quad \text{Formula (1)}$$

$$i.\text{gain.max} = \frac{i.\text{max} - i.\text{min}}{i.\text{min}} \quad \text{Formula (2)}$$

In the foregoing formula (1) and formula (2), i.gain is the current gain, duty0.max is the maximum value in the initial dimming duty cycles corresponding to the backlight partitions, duty0.min is the minimum value in the initial dimming duty cycles of the backlight partitions, i.max is the upper drive current threshold, i.min is the lower drive current threshold, and i.gain.max is a maximum current gain.

In a possible implementation, after calculating the current gain, the display device may calculate the drive current value based on the current gain and the lower drive current threshold according to the following formula (3). The formula (3) may be as follows:

$$i1 = i.\text{min} * (1 + i.\text{gain}) \quad \text{Formula (3)}$$

In the foregoing formula (3), i1 is the drive current value, i.gain is the current gain, and i.min is the lower drive current threshold.

For example, the maximum value duty0.max in the initial dimming duty cycles corresponding to the backlight partitions on the display device may be 100%, and the minimum value duty0.min in the initial dimming duty cycles corresponding to the backlight partitions may be 50%, that is, a maximum difference between the initial dimming duty cycles of the backlight partitions is 50%, the upper drive current threshold i.max is 100 mA, and the lower drive current threshold i.min is 20 mA. Therefore, the display device may calculate, based on the upper drive current threshold i.max and the lower drive current threshold i.min according to the foregoing formula (2), that a maximum current gain i.gain.max is 4. Then, the display device may calculate, based on the maximum current gain i.gain.max, the maximum value duty0.max in the initial dimming duty cycles, and the minimum value duty0.min in the initial dimming duty cycles according to the foregoing formula (1), that the current gain i.gain is 2.0. Then, the display device may calculate, based on the current gain i.gain and the lower drive current threshold i.min according to the foregoing formula (3), that the drive current value is 60 mA.

It should be noted that the foregoing examples are merely used to explain this application and shall not be construed as a limitation. The foregoing formula (1), formula (2), and formula (3) are merely examples. In specific implementation, the display device may determine the drive current value based on the maximum value and the minimum value in the initial dimming duty cycles of the backlight partitions and the drive current threshold data according to another calculation formula. This is not limited in this embodiment of this application.

In a possible implementation, after determining the drive current value, the display device may separately adjust, based on the determined drive current value, light emitting brightness of the backlight region that exists when a liquid crystal display panel displays the to-be-displayed image.

In another possible implementation, after determining the drive current value, the display device may further determine a dimming duty cycle of each backlight region on the liquid crystal display panel by using another duty cycle determining method, for example, based on the RGB data of the to-be-displayed image of the display device. The display device may adjust the light emitting brightness of the backlight region of the liquid crystal display panel based on the drive current value and the dimming duty cycle that is determined based on the RGB data of the to-be-displayed image.

S706: The display device may determine a brightness gain corresponding to each backlight partition based on the initial dimming duty cycle corresponding to each backlight partition.

The display device may determine the brightness gain corresponding to each backlight partition based on the initial dimming duty cycle corresponding to each backlight partition by using a preset correspondence between an initial dimming duty cycle and a brightness gain. A storage form of the preset correspondence between an initial dimming duty cycle and a brightness gain may be a form of a table or an algorithm function. This is not limited herein.

Figure 8:
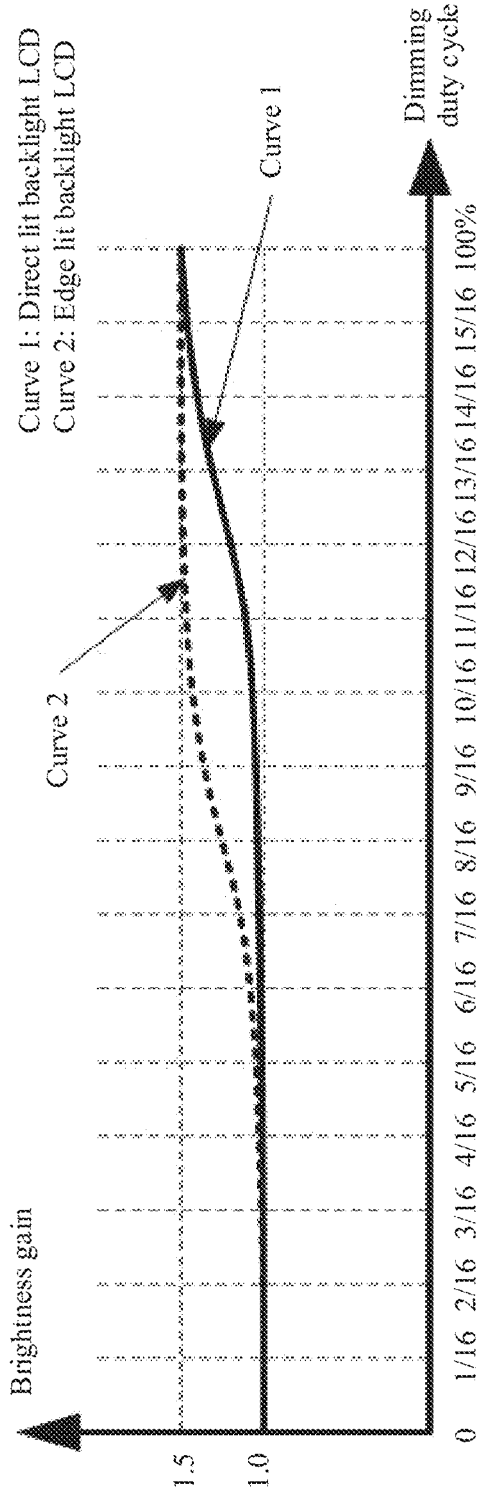
FIG. 8 is a schematic curve diagram of a dimming duty cycle and a brightness gain according to an embodiment of this application.

For example, FIG. 8 is a schematic curve diagram of the correspondence between an initial dimming duty cycle and a brightness gain. As shown in FIG. 8, when the display of the display device is a direct lit backlight LCD, the display device may use a curve 1 as the correspondence between an initial dimming duty cycle and a brightness gain. When the display of the display device is an edge lit backlight LCD, the display device may use a curve 2 as the correspondence between an initial dimming duty cycle and a brightness gain.

When an initial dimming duty cycle is greater than a specified threshold (for example, 5/16), a brightness gain corresponding to the initial dimming duty cycle on the curve 2 is greater than or equal to a brightness gain corresponding to the initial dimming duty cycle on the curve 1. For example, on the curve 1, when an initial dimming duty cycle is less than 7/16, a brightness gain corresponding to the initial dimming duty cycle is 1; and when the initial dimming duty cycle is greater than 7/16, the brightness gain corresponding to the initial dimming duty cycle gradually increases to 1.5 as the initial dimming duty cycle increases. On the curve 2, when an initial dimming duty cycle is less than 3/16, a brightness gain corresponding to the initial dimming duty cycle is 1; when the initial dimming duty cycle is greater than 12/16, the brightness gain corresponding to the initial dimming duty cycle is 1.5; and when the initial dimming duty cycle is between 7/16 and 12/16, the brightness gain corresponding to the initial dimming duty cycle gradually increases to 1.5 as the initial dimming duty cycle increases. The foregoing example is merely used to explain this application and shall not be construed as a limitation.

In the correspondence between an initial dimming duty cycle and a brightness gain, values of the initial dimming duty cycle may be discrete. For example, a minimum scale of the initial dimming duty cycle may be 1/16, and a value of the initial dimming duty cycle may be 1/16, 2/16, 3/16, 4/16, 5/16, 6/16, 7/16, 8/16, 9/16, 10/16, 11/16, 12/16, 13/16, 14/16, 15/16, or 16/16. The foregoing example is merely used to explain this application and shall not be construed as a limitation. In specific implementation, a minimum scale of the initial dimming duty cycle may be smaller or larger.

Compared with the direct lit backlight LCD, a backlight partition of the edge lit backlight LCD is rougher. Therefore, the curve 1 is used as the correspondence between dimming duty cycle and a brightness gain, so that the display device of the edge lit backlight LCD can obtain a high brightness gain in an image display scenario with a low average pixel level (average pixel level, APL).

In a possible implementation, the display device may further store the correspondence between an initial dimming duty cycle and a brightness gain in a form of a table. For example, the correspondence between an initial dimming duty cycle and a brightness gain may be shown in Table 2:

TABLE 2

| Initial dimming duty cycle | Brightness gain |
|---|---|
| 0 | 1 |
| 1/16 | 1 |
| 2/16 | 1 |
| 3/16 | 1 |
| 4/16 | 1 |
| 5/16 | 1 |
| 6/16 | 1 |
| 7/16 | 1 |
| 8/16 | 1.02 |
| 9/16 | 1.04 |
| 10/16 | 1.08 |
| 11/16 | 1.18 |
| 12/16 | 1.28 |
| 13/16 | 1.38 |
| 14/16 | 1.44 |
| 15/16 | 1.48 |
| 16/16 | 1.5 |

It can be learned from Table 2 that when an initial dimming duty cycle is less than or equal to 7/16, a brightness gain may be 1. When the initial dimming duty cycle is 8/16, the brightness gain may be 1.02. When the initial dimming duty cycle is 9/16, the brightness gain may be 1.04. When the initial dimming duty cycle is 10/16, the brightness gain may be 1.08. When the initial dimming duty cycle is 11/16, the brightness gain may be 1.18. When the initial dimming duty cycle is 12/16, the brightness gain may be 1.28. When the initial dimming duty cycle is 13/16, the brightness gain may be 1.38. When the initial dimming duty cycle is 14/16, the brightness gain may be 1.44. When the initial dimming duty cycle is 15/16, the brightness gain may be 1.48. When the initial dimming duty cycle is 16/16, the brightness gain may be 1.5. The foregoing examples shown in Table 2 are merely used to explain this application and are not limited herein.

S707: The display device determines an actual dimming duty cycle corresponding to each backlight partition based on the initial dimming duty cycle corresponding to each backlight partition, the drive current threshold data, and the brightness gain corresponding to each backlight partition.

The display device may determine a current gain based on a maximum value and a minimum value in the initial dimming duty cycles corresponding to the backlight partitions and the drive current threshold data. Then, the display device may determine the actual dimming duty cycle corresponding to each backlight partition based on the current gain, the initial dimming duty cycle corresponding to each backlight partition, and the brightness gain corresponding to each backlight partition.

The display device may determine the current gain based on the maximum value and the minimum value in the initial dimming duty cycles corresponding to the backlight partitions and the drive current threshold data according to the foregoing formula (1) and formula (2). In this embodiment of this application, if the display device has calculated the current gain in step S705, the current gain does not need to be calculated again in step S706.

In a possible implementation, the display device may determine the actual dimming duty cycle corresponding to each backlight partition based on the current gain, the initial dimming duty cycle corresponding to each backlight partition, and the brightness gain corresponding to each backlight partition according to the following formula (4). The formula (4) may be as follows:

$$\text{duty }1[m,n]=\min\left(100\%,\ \text{duty }0[m,n]*\frac{\text{boost.gain }[m,n]}{1+i.\text{gain}}\right)\quad\text{Formula (4)}$$

In the foregoing formula (4), duty1[m,n] is an actual dimming duty cycle corresponding to a backlight partition in the $m^{th}$ row and the $n^{th}$ column in the backlight region. duty0[m,n] is an initial dimming duty cycle corresponding to the backlight partition in the $m^{th}$ row and the $n^{th}$ column in the backlight region. boost.gain[m,n] is a brightness gain corresponding to the backlight partition in the $m^{th}$ row and the $n^{th}$ column in the backlight region. i.gain is the current gain. $1 \le m \le M$, $1 \le n \le N$, M is a quantity of rows of the backlight partitions of the display device, and N is a quantity of columns of the backlight partitions of the display device.

It should be noted that, if a one-dimensional (1D) edge lit backlight LCD is on the display device, duty1[t] may be used to represent an actual dimming duty cycle corresponding to the $t^{th}$ backlight partition, duty0[t] is an initial dimming duty cycle corresponding to the $t^{th}$ backlight partition, boost.gain[t] is a brightness gain corresponding to the $t^{th}$ backlight partition, and a current gain is represented by i.gain. $1 \le t \le T$. and T is a quantity of backlight partitions of the display device.

That is, when the one-dimensional (1D) edge lit backlight LCD is on the display device, the display device may determine the actual dimming duty cycle corresponding to each backlight partition based on the current gain, the initial dimming duty cycle corresponding to each backlight partition, and the brightness gain corresponding to each backlight partition according to the following formula (5). The formula (5) may be as follows:

$$\text{duty }1[t]=\min\left(100\%,\ \text{duty }0[t]*\frac{\text{boost.gain }[t]}{1+i.\text{gain}}\right)\quad\text{Formula (5)}$$

For example, a maximum value duty0.max in the initial dimming duty cycles corresponding to the backlight partitions on the display device may be 100%, and a minimum value duty0.min in the initial dimming duty cycles corresponding to the backlight partitions may be 50%, that is, a maximum difference between the initial dimming duty cycles of the backlight partitions is 50%, an upper drive current threshold i.max is 100 mA, a lower drive current threshold i.min is 20 mA, an initial duty cycle duty0[7,1] corresponding to a backlight partition in the seventh row and the first column is 75%, and a brightness gain boost.gain[7, 1]corresponding to the backlight partition in the seventh row and the first column is 1.28.

Therefore, the display device may first calculate, based on the upper drive current threshold i.max and the lower drive current threshold i.min according to the foregoing formula (2), that a maximum current gain i.gain.max is 4. Then, the display device may calculate, based on the maximum current gain i.gain.max, the maximum value duty0.max in the initial dimming duty cycles, and the minimum value duty0.min in the initial dimming duty cycles according to the foregoing formula (1), that the current gain i.gain is 2.0. Then, the display device may calculate, based on the initial duty cycle duty0[7,1] corresponding to the backlight partition in the seventh row and the first column, and the brightness gain boost.gain[7,1] and the current gain i.gain corresponding to the backlight partition in the seventh row and the first column according to the foregoing formula (4), that an actual dimming duty cycle duty1[7,1] corresponding to the backlight partition in the seventh row and the first column is 32%.

The foregoing example is merely used to explain this application and shall not be construed as a limitation.

In this embodiment of this application, the foregoing formula (4) and formula (5) are merely used to explain this application, and should not be construed as a limitation. In specific implementation, the display device may determine the actual dimming duty cycle corresponding to each backlight partition based on the initial dimming duty cycle corresponding to each backlight partition, the drive current threshold data, and the brightness gain corresponding to each backlight partition according to another formula.

In this embodiment of this application, step S705 may be performed before step S706, or step S705 and step S706 or step S707 may be performed at the same time, or step S705 may be performed after step S707. When step S705 is performed before step S706, the current gain determined in step S705 may be used in step S707. When step S705 is performed after step S707, the current gain determined in step S707 may be used in step S705.

S708: The display device controls, based on the drive current value and the actual dimming duty cycle corresponding to each backlight partition, light emitting brightness of each backlight partition that exists when the to-be-displayed image is displayed.

When the method is performed by the display device, the display device directly controls the light emitting brightness of each backlight partition based on the determined actual dimming duty cycle and the drive current (or based on the drive current determined in these steps and a dimming duty cycle of each partition determined in the conventional technology). After an application processor performs S701 to S705, or further performs S706 and S707, the application processor may indicate an LCD display of a device in which the application processor is located or an LCD display connected to the application processor to adjust light emitting brightness of each backlight partition based on the drive current determined in these steps and the dimming duty cycle of each partition determined in the conventional technology (or the drive current and the dimming duty cycle of each partition that are determined in the foregoing steps).

In a possible implementation, to ensure transition smoothness of display brightness of the backlight partitions, the display device may perform spatial smooth filtering on actual dimming duty cycles of adjacent backlight partitions. Then, the display device controls, based on the drive current value and the actual dimming duty cycle that is obtained after the spatial smooth filtering and that corresponds to each backlight partition, the light emitting brightness of each backlight partition that exists when the to-be-displayed image is displayed.

According to the display brightness adjustment method provided in this embodiment of this application, display brightness of a displayed image can be automatically and continuously adjusted based on content of the displayed image by using a current between a maximum current and a minimum current that are provided by a power supply design for the display panel. In this way, both local peak brightness of HDR display and smooth gradation of brightness of a dynamic picture can be ensured, a power supply capability of the power supply for the display panel is maximized, and an HDR display effect is enhanced.

The following describes a display system provided in embodiments of this application.

Figure 9:
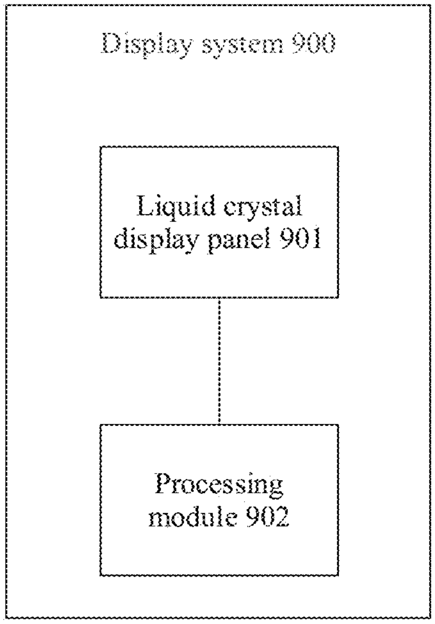
FIG. 9 is a schematic diagram of a display system according to an embodiment of this application.

FIG. 9 is a schematic diagram of a display system 900 according to an embodiment of this application. The display device 100 may include the display system 900.

As shown in FIG. 9, the display system 900 may include a liquid crystal display panel 901 and a processing module 902. The liquid crystal display panel 901 may be a direct lit backlight LCD display panel or an edge lit backlight LCD display panel. A backlight region of the liquid crystal display panel 901 may include several backlight partitions.

The processing module 902 may be configured to obtain drive current threshold data of a backlight source on the liquid crystal display panel 901.

The processing module 902 may be further configured to obtain a to-be-displayed image.

The processing module 902 may be further configured to obtain a to-be-displayed image.

The processing module 902 may be further configured to determine an initial dimming duty cycle corresponding to each backlight partition based on an average pixel brightness value of each backlight partition and a local dimming algorithm.

The processing module 902 may be further configured to determine a drive current value based on a maximum value and a minimum value in the initial dimming duty cycles corresponding to the backlight partitions and the drive current threshold data.

The processing module 902 may be further configured to determine a brightness gain corresponding to each backlight partition based on the initial dimming duty cycle corresponding to each backlight partition.

The processing module 902 may be further configured to determine an actual dimming duty cycle corresponding to each backlight partition based on the initial dimming duty cycle corresponding to each backlight partition, the drive current threshold data, and the brightness gain corresponding to each backlight partition.

The processing module 902 may be further configured to control, based on the drive current value and the actual dimming duty cycle corresponding to each backlight partition, light emitting brightness of each backlight partition that exists when the liquid crystal display panel 901 displays the to-be-displayed image.

For details, refer to the method embodiment shown in FIG. 5. Details are not described herein again.

According to the display system 900 provided in this embodiment of this application, display brightness of a displayed image can be automatically and continuously adjusted based on content of the displayed image by using a current between a maximum current and a minimum current that are provided by a power supply design for the liquid crystal display panel. In this way, both local peak brightness of HDR display and smooth gradation of brightness of a dynamic picture can be ensured, a power supply capability of the power supply for the display panel is maximized, and an HDR display effect is enhanced.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof without departing from the scope of the technical solutions of embodiments of this application.

What is claimed is:

1. A display brightness adjustment method implemented by an electronic apparatus, wherein the display brightness adjustment method comprises:
- obtaining a to-be-displayed image;
- determining, based on the to-be-displayed image, a plurality of average pixel brightness values of a plurality of backlight partitions of a backlight region of a liquid crystal display (LCD) panel, wherein each respective average pixel brightness value of the plurality of average pixel brightness values corresponds to a respective backlight partition of the plurality of backlight partitions;
- determining, based on the plurality of average pixel brightness values, a plurality of initial dimming duty cycles for the plurality of backlight partitions by determining each respective initial dimming duty cycle of the plurality of initial dimming duty cycles based on the respective average pixel brightness value corresponding to the respective backlight partition;
- determining, based on the plurality of initial dimming duty cycles and drive current threshold data that comprises an upper drive current threshold and a lower drive current threshold and a maximum drive current value and a minimum drive current value in the plurality of initial dimming duty cycles corresponding to the backlight partitions, a drive current value; and
- indicating, based on the drive current value, to adjust light emitting brightness of the backlight region when the LCD panel displays the to-be-displayed image.

2. The display brightness adjustment method of claim 1, wherein the drive current threshold data is of a backlight source on the LCD panel, and wherein the display brightness adjustment method further comprises obtaining the drive current threshold data.

3. The display brightness adjustment method of claim 1, further comprising:
- determining, based on the plurality of initial dimming duty cycles and the drive current threshold data, actual dimming duty cycles respectively corresponding to the plurality of backlight partitions; and
- indicating, based on the actual dimming duty cycles, to adjust the light emitting brightness.

4. The display brightness adjustment method of claim 1, wherein determining the drive current value comprises:
- determining a current gain based on the maximum drive current value and the minimum drive current value in the initial dimming duty cycles corresponding to the backlight partitions, and the drive current threshold data; and
- determining the drive current value further based on the current gain.

5. The display brightness adjustment method of claim 3, wherein determining the actual dimming duty cycles comprises:
- determining, based on the plurality of initial dimming duty cycles, brightness gains respectively corresponding to the plurality of backlight partitions; and
- determining the actual dimming duty cycles based on the plurality of initial dimming duty cycles, the drive current threshold data, and the brightness gains.

6. The display brightness adjustment method of claim 5, wherein determining the actual dimming duty cycles further comprises:
- determining a current gain based on a maximum value in the plurality of initial dimming duty cycles, a minimum value in the plurality of initial dimming duty cycles, and the drive current threshold data; and determining the actual dimming duty cycles based on the current gain, the plurality of initial dimming duty cycles, and the brightness gains.

7. A display device, comprising:

a liquid crystal display (LCD) panel comprising a backlight region comprising a plurality of backlight partitions; and one or more processors coupled to the LCD panel and configured to cause the display device to:

obtain a to-be-displayed image;

determine, based on the to-be-displayed image, a plurality of average pixel brightness values of the plurality of backlight partitions, wherein each respective average pixel brightness value of the plurality of average pixel brightness values corresponds to a respective backlight partition of the plurality of backlight partitions;

determine, based on the plurality of average pixel brightness values, a plurality of initial dimming duty cycles for the plurality of backlight partitions by determining each respective initial dimming duty cycle of the plurality of initial dimming duty cycles based on the respective average pixel brightness value corresponding to the respective backlight partition;

determine, based on the plurality of initial dimming duty cycles and drive current threshold data that comprises an upper drive current threshold and a lower drive current threshold and a maximum drive current value and a minimum drive current value in the plurality of initial dimming duty cycles corresponding to the backlight partitions, a drive current value; and adjust, based on the drive current value, light emitting brightness of the backlight region when the LCD panel displays the to-be-displayed image.

8. The display device of claim 7, wherein the one or more processors are further configured to cause the display device to obtain the drive current threshold data.

9. The display device of claim 7, wherein the one or more processors are further configured to cause the display device to:

determine, based on the plurality of initial dimming duty cycles and the drive current threshold data, actual dimming duty cycles respectively corresponding to the plurality of backlight partitions; and adjust, based on the actual dimming duty cycles, the light emitting brightness.

10. The display device of claim 7, wherein the one or more processors are further configured to cause the display device to:

determine a current gain based on the maximum drive current value and the minimum drive current value in the initial dimming duty cycles corresponding to the backlight partitions, and the drive current threshold data; and determine the drive current value further based on the current gain.

11. The display device of claim 9, wherein the one or more processors are further configured to cause the display device to:

determine, based on the plurality of initial dimming duty cycles, brightness gains respectively corresponding to the plurality of backlight partitions; and determine the actual dimming duty cycles based on the plurality of initial dimming duty cycles, the drive current threshold data, and the brightness gains.

12. The display device of claim 11, wherein the one or more processors are further configured to cause the display device to:

determine a current gain based on a maximum value in the plurality of initial dimming duty cycles, a minimum value in the initial dimming duty cycles, and the drive current threshold data; and determine the actual dimming duty cycles based on the current gains, the plurality of initial dimming duty cycles, and the brightness gains.

13. The display device of claim 7, wherein the display device is a television (TV).

14. A non-transitory computer-readable medium comprising instructions that, when executed by a processor, cause a display device to:

obtain a to-be-displayed image;

determine, based on the to-be-displayed image, a plurality of average pixel brightness values of a plurality of backlight partitions of a backlight region of a liquid crystal display (LCD) panel of the display device, wherein each respective average pixel brightness value of the plurality of average pixel brightness values corresponds to a respective backlight partition of the plurality of backlight partitions;

determine, based on the plurality of average pixel brightness values, a plurality of initial dimming duty cycles for the plurality of backlight partitions by determining each respective initial dimming duty cycle of the plurality of initial dimming duty cycles based on the respective average pixel brightness value corresponding to the respective backlight partition;

determine, based on the plurality of initial dimming duty cycles and drive current threshold data that comprises an upper drive current threshold and a lower drive current threshold and a maximum drive current value and a minimum drive current value in the plurality of initial dimming duty cycles corresponding to the backlight partitions, a drive current value; and indicate, based on the drive current value, to adjust light emitting brightness of the backlight region when the LCD panel is configured to display the to-be-displayed image.

15. A liquid crystal display (LCD) device backlight control apparatus, comprising:

one or more memories configured to store computer program code; and one or more processors coupled to the one or more memories and configured to execute the computer program code to cause the LCD device backlight control apparatus to:

obtain a to-be-displayed image;

determine, based on the to-be-displayed image, a plurality of average pixel brightness values of a plurality of backlight partitions of a backlight region of an LCD panel of a display device configured to be coupled to the LCD device backlight control apparatus, wherein each respective average pixel brightness value of the plurality of average pixel brightness values corresponds to a respective backlight partition of the plurality of backlight partitions;

determine, based on the plurality of average pixel brightness values, a plurality of initial dimming duty cycles for the plurality of backlight partitions by determining each respective initial dimming duty cycle of the plurality of initial dimming duty cycles based on the respective average pixel brightness value corresponding to the respective backlight partition;

determine, based on the plurality of initial dimming duty cycles and drive current threshold data that comprises an upper drive current threshold and a lower drive current threshold and a maximum drive current value and a minimum drive current value in the plurality of initial dimming duty cycles corresponding to the backlight partitions, a drive current value; and indicate, based on the drive current value, to adjust light emitting brightness of the backlight region when the LCD panel is configured to display the to-be-displayed image.

16. The LCD device backlight control apparatus of claim 15, wherein the LCD backlight control apparatus is an application processor.

17. The display device of claim 7, wherein the one or more processors comprise an application processor.

18. The LCD device backlit control apparatus of claim 15, wherein the display device is a television (TV).

19. The non-transitory computer-readable medium of claim 14, wherein the display device is a television (TV).

20. The non-transitory computer-readable medium of claim 14, wherein the one or more processors comprises an application processor.

* * * * *